Feb. 26, 1957

R. E. DELAMATER 2,782,486

LOCATING PIN

Filed July 7, 1954

INVENTOR.
ROLAND E. DELAMATER
BY
RICHEY, WATTS, EDGERTON & McNENNY

AH Edgerton
ATTORNEYS

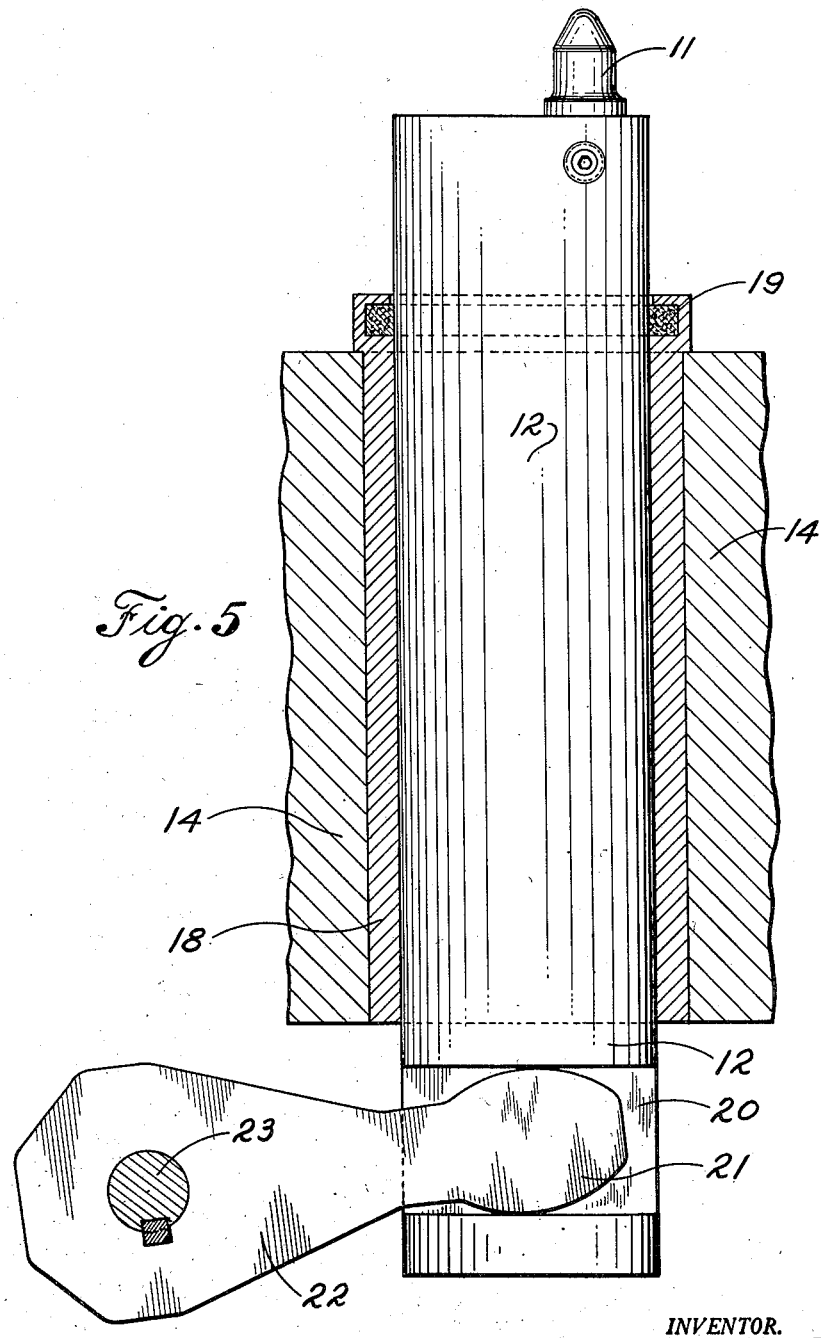

United States Patent Office 2,782,486
Patented Feb. 26, 1957

2,782,486
LOCATING PIN

Roland Eugene Delamater, Cleveland, Ohio, assignor to The Foote-Burt Company, Cleveland, Ohio, a corporation of Ohio Application July 7, 1954, Serial No. 441,880

8 Claims. (Cl. 29—1)

This invention relates broadly to locating pins of the character employed to position work pieces in fixtures, jigs and metal working machine tools, and more specifically to improvements in the structure of such pins and the organization thereof in the machines or fixtures.

The function of the locating pins or dowels, contemplated herein, is the same as that customarily employed in jigs and fixtures of orthodox form but structure of the improved assembly departs therefrom in that one of the pins is rigidly mounted in the fixture while the other pin is free to move compensative of error (the high or low limits of the specified tolerance) in the center-to-center dimension of the pilot bearing holes in the work.

In the construction of fixtures, jigs, etc. there is no serious difficulty in holding the center-to-center dimension between two work locating pins within the prescribed tolerance, but it is difficult to maintain the same degree of accuracy in the work, particularly when the parts are subject to high production runs where the drill bushings are subject to wear or misalignment through warpage. Hence it has been the practice, heretofore, to form one of the pins with a cylindrical body and flatten or relieve opposed sides of the second pin to permit the work to float within the limits specified for the center-to-center distance between the pins. Such practice has been found objectionable, since the edges defined by the flattened pin score or mutilate the dowel pin hole in the work thus destroying the utility of the pilot bearing holes for further use in subsequent machining operations.

One of the objects of the invention is to provide a locating pin assembly which is designed to avoid deformation of the dowel or locating pin holes in the work, yet offer no resistance to the engagement of the pins with work pieces having inaccurately spaced dowel holes therein.

Further objects of the invention reside in the provision of a locating pin assembly which is efficient of operation, economic of manufacture, durable of structure, and adapted to accommodate manipulation of the work with ease and dispatch.

Other objects and advantages more or less ancillary to the foregoing, and the manner in which all the various objects are realized, will appear in the following description, which considered in connection with the accompanying drawings, sets forth the preferred embodiment of the invention.

In the drawings:

Fig. 5 is a sectional view through a fragmentary portion of a machine illustrating the improved pin assembly adapted for use as a retractable locating pin.

Figure 1:
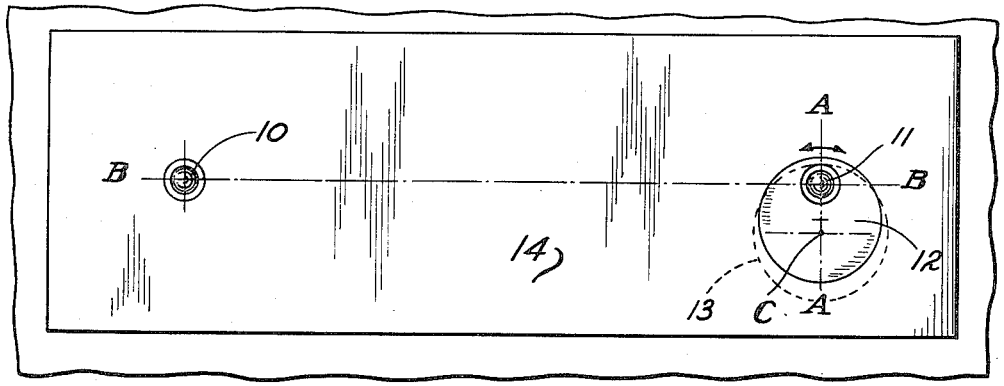
Fig. 1 is a diagrammatic view of a fixture embodying the improved locating pin assembly.
Figure 2:
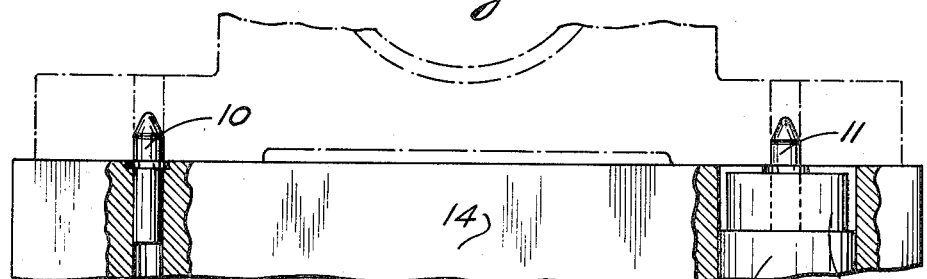
Fig. 2 is a side elevational view thereof, and a work piece illustrated by dot-dash lines.
Figure 3:
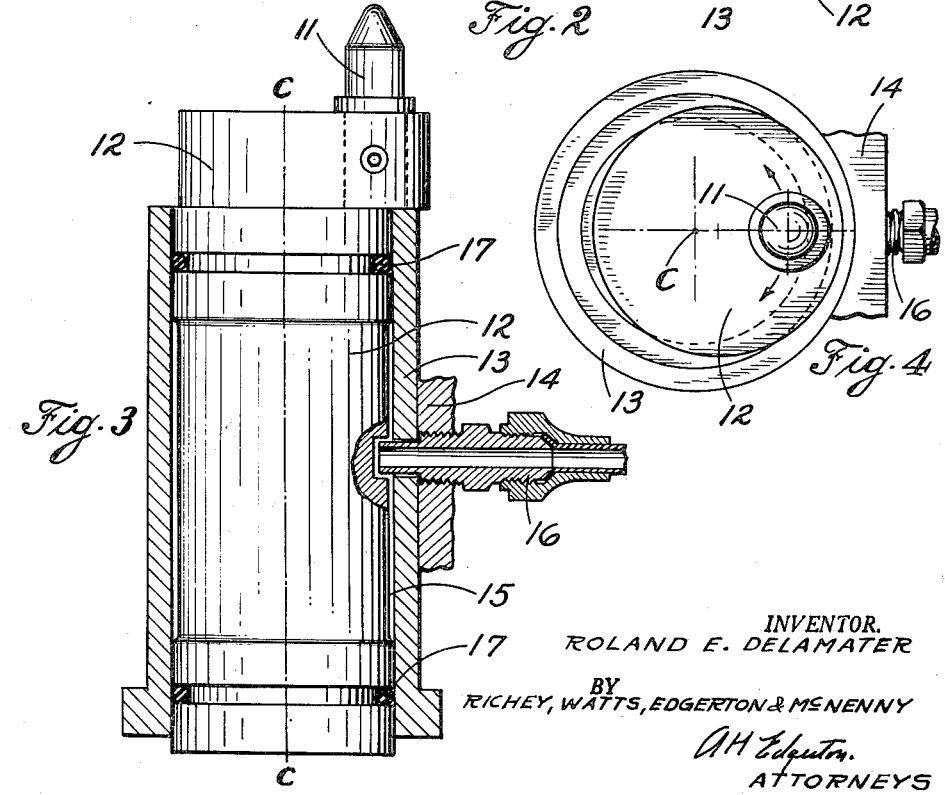
Fig. 3 is a vertical sectional view of a radial movable dowel embodied in the locating pin assembly.
Figure 4:
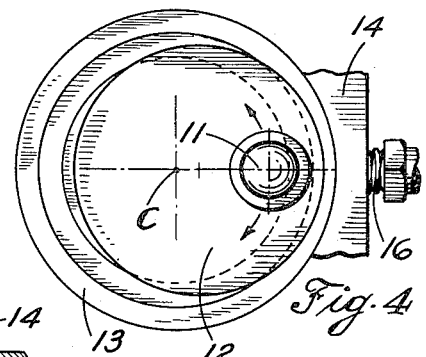
Fig. 4 is a plan view thereof.

As shown in Fig. 1, the locating pin assembly comprises a fixed cylindrical pin 10 and a second similar pin 11 mounted in the end of a shaft 12 in eccentric relation to the medial axis thereof. The shaft 12 is journalled for restricted rotative movement in a hardened and ground sleeve 13 pressed or otherwise secured in the fixture 14. The shaft 12 is preferably formed with a diametrically reduced body portion 15 to provide a reservoir for the reception of a light lubricant injected under low pressure through a coupling 16 mounted in the body of the fixture. The end portions of the shaft 12 are grooved to receive oil seals 17 to restrict escapement of the lubricant, though other forms of lubrication may be substituted therefor.

As illustrated in Fig. 1, the center of the shaft 12 is disposed in spaced relation with the center of the pin 11 and the line A—A through the center of the pin 11 and axis C of the shaft 12 is disposed at an angle of 90° to the centerline B—B for the pins 10 and 11. The pins are formed with conical ends to facilitate the initial introduction of the work thereon, thus when the center-to-center distance between the dowel pin holes in the work has been machined to the high limit of the specified tolerance, the shaft 12 will oscillate within its journal bearing about its axis C and cause the pin 11 to move to the right, as shown by the arrows in Fig. 1; and conversely, when the center-to-center distance between the dowel pin holes in the work has been machined to the low limit of the tolerance, the shaft 12 will swing to the left and permit the pin 11 to enter the pilot bearing hole in the work. The pins 10 and 11 are ground for snug engagement in the holes in the work. Hence, as the shaft 12 oscillates about its axis C, the movement of the work mounted on the pin 11 towards and away from the centerline B—B will be insignificant. For example, if the tolerance between the pins 10 and 11 is plus or minus three thousandths of an inch (±.003) the total distance of movement of the pin 11 away from the center line B—B would not exceed .00005 inch.

As illustrated in Fig. 5, the bushing 18 is formed with a flange in the upper end thereof which is machined with an internal groove therein for the reception of a packing ring 19 to prevent the entry of chips or other foreign matter within the bore. The lower end of the shaft 12 protrudes beyond the bushing 18 and is formed with a transverse bore 20 adjacent the lower end thereof to receive the spherical end 21 of an arm 22 keyed to a shaft 23 which is coupled through linkage (not shown) to mechanism in the machine for actuating the arm upon completion of the machining operation performed on the work while retained in place by the pins 10 and 11. The shaft 12 in this embodiment is cylindrical throughout its length to facilitate retraction thereof within its bushing upon actuation of the arm 22 and the length of the arm is proportioned relative to the height of the pin 11 above the surface of the machine upon which the work rests to effect the full retraction of the pin from the work when the arm reaches its maximum throw.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A locating pin assembly for metal working machine tool fixtures comprising a fixed pin mounted in the fixture, a shaft mounted for vertical axial and free rotational movement in spaced relation with said pin and a second pin mounted in the end of said shaft, the axis of said shaft being disposed in offset relation to the centerline between the first and second named pins at an angle of ninety degrees.

2. A locating pin assembly for machine tool fixtures comprising a fixed pin in the fixture, a shaft mounted for free rotational and vertical axial movement in the fixture in spaced relation to said pin and a second pin mounted in said shaft in a plane common to the vertical axis of the first pin, the axis of said shaft being disposed in a plane normal said plane of the first and second named pins.

3. A locating pin assembly for fixtures comprising a pin rigidly mounted in the fixture, a freely rotatable shaft mounted in the fixture in spaced relation to said pin, a second pin mounted in the end of the shaft in eccentric relation to the medial axis thereof, the centerline between said pins being disposed at a right angle to the centerline between said second pin and the axis of said shaft.

4. A locating pin assembly for fixtures comprising a fixed pin mounted in the fixture, a second pin disposed in spaced relation with the first pin, a bushing in said fixture disposed at right angles to the centerline between said pins, a shaft rotatable in said bushing, said second pin being mounted eccentrically in the end of said shaft.

5. A locating pin assembly for machine tools comprising a fixed pin and movable second pin disposed in the fixture in spaced relation with each other, a freely rotative shaft in said fixture disposed at right angles to the centerline between said pins, said second pin being mounted eccentrically in the end of said shaft.

6. A locating pin assembly for fixtures comprising a pin rigidly mounted in the fixture, a bushing in said fixture in spaced parallel relation to said pin, a shaft mounted for vertical axial movement and free rotation in said bushing, the central portion of said shaft being undercut to define a lubricant reservoir in said bushing, sealing means adjacent the ends of said bushing, a conduit connected to said reservoir, a second pin in the end of said shaft in a plane common to the medial axis of the first named pin, the axis of said shaft being disposed at a ninety-degree angle to the centerline between said pins.

7. A locating pin assembly for a machine tool comprising a fixed pin in the fixture, a shaft mounted for free rotation in the fixture and disposed in spaced relation to said pin, a second pin in the end of said shaft in spaced relation to the medial axis thereof, said shaft being disposed at right angles to the centerline between said pins, said shaft having a transaxial bore adjacent the end thereof opposite said second named pin, and a ball-ended crank arm engaged in said bore to effect reciprocative movement of said shaft.

8. A locating pin assembly for a machine tool comprising a fixed pin in the fixture, a shaft mounted for free rotation in the fixture disposed in spaced relation to said pin, a second pin in the end of said shaft in spaced relation to the medial axis thereof, said shaft being disposed at right angles to the centerline between said pins, and means coupled with said shaft for the retractive movement thereof.

References Cited in the file of this patent

UNITED STATES PATENTS

| | | |
|---|---|---|
| 767,556 | Egge | Aug. 16, 1904 |
| 971,370 | Gridley | Sept. 27, 1910 |
| 1,721,648 | Swartz | July 23, 1929 |
| 2,017,865 | Morgan | Oct. 22, 1935 |